US009314761B2

(12) United States Patent
Tetzlaff

(10) Patent No.: US 9,314,761 B2
(45) Date of Patent: Apr. 19, 2016

(54) METHOD AND DEVICE FOR PRODUCING SYNTHESIS GAS FROM GASEOUS HYDROCARBONS

(76) Inventor: Karl-Heinz Tetzlaff, Kelkheim (DE)

( * ) Notice: Subject to any disclaimer, the term of this patent is extended or adjusted under 35 U.S.C. 154(b) by 889 days.

(21) Appl. No.: 13/122,864

(22) PCT Filed: Oct. 8, 2009

(86) PCT No.: PCT/EP2009/063073
§ 371 (c)(1),
(2), (4) Date: Aug. 17, 2011

(87) PCT Pub. No.: WO2010/040795
PCT Pub. Date: Apr. 15, 2010

(65) Prior Publication Data
US 2012/0025140 A1 Feb. 2, 2012

(30) Foreign Application Priority Data

Oct. 8, 2008 (DE) .......... 10 2008 050 817

(51) Int. Cl.
C01B 3/44 (2006.01)
B01J 7/02 (2006.01)
B01J 8/18 (2006.01)
(Continued)

(52) U.S. Cl.
CPC ............ *B01J 8/1836* (2013.01); *B01J 8/067* (2013.01); *C01B 3/384* (2013.01); *B01J 2208/00398* (2013.01); *B01J 2208/00407* (2013.01); *B01J 2208/00415* (2013.01); *C01B 2203/0233* (2013.01); *C01B 2203/085* (2013.01); *C01B 2203/1011* (2013.01); *C01B 2203/1058* (2013.01); *C01B 2203/1235* (2013.01); *C01B 2203/1241* (2013.01); *C01B 2203/84* (2013.01)

(58) Field of Classification Search
USPC .............. 48/61, 127.1, 127.9, 76, 200–204, 48/197 R; 422/139, 625, 630, 628
See application file for complete search history.

(56) References Cited

U.S. PATENT DOCUMENTS 3,147,080 A * 9/1964 Jahnig ................ C01B 3/30
423/654
3,499,947 A * 3/1970 Johnson ................ B01J 8/42
208/163
3,644,100 A * 2/1972 Lhonore ............... B01J 8/1836
165/104.16

(Continued)

FOREIGN PATENT DOCUMENTS

CA 2 396 402 A1 1/2004
DE 1 714 833 1/1956

(Continued)

OTHER PUBLICATIONS

Charles M. Kinoshita, et al.; "Effect of Reformer Conditions on Catalytic Reforming of Biomass-Gasification Tars"; Ind. Eng. Chem. Res. Sep. 1995, vol. 34, No. 9, pp. 2949-2954; XP-002568123.

*Primary Examiner* — Kaity Handal
(74) *Attorney, Agent, or Firm* — The Webb Law Firm

(57) ABSTRACT

A method for the production of synthesis gas from gaseous hydrocarbons includes the use of allothermal steam reforming with catalysts. In order to produce the synthesis gas efficiently without exhaust gas in a compact apparatus, energy is at least partly supplied by electrical energy, that the energy is supplied by electrically heated contact surfaces and that the energy is supplied by contact surfaces within a fixed bed of catalyst pellets and/or within a fluidized bed at least partly consisting of catalyst particles.

16 Claims, 2 Drawing Sheets

(51) Int. Cl.
   *B01J 8/06*   (2006.01)
   *C01B 3/38*   (2006.01)

(56) References Cited

U.S. PATENT DOCUMENTS

| | | | |
|---|---|---|---|
| 5,019,356 A | 5/1991 | Silberring | |
| 5,306,481 A | 4/1994 | Mansour et al. | |
| 6,585,940 B2 | 7/2003 | Abe et al. | |
| 6,620,368 B1 | 9/2003 | Wang et al. | |
| 6,992,112 B2 | 1/2006 | Wang et al. | |
| 2004/0097371 A1 | 5/2004 | Jangbarwala | |
| 2005/0229488 A1 | 10/2005 | Stevens | |
| 2008/0107937 A1* | 5/2008 | Ravenda et al. | 429/19 |

FOREIGN PATENT DOCUMENTS

| | | |
|---|---|---|
| DE | 258 651 A1 | 7/1988 |
| DE | 699 08 242 T2 | 3/2004 |
| DE | 698 30 222 T2 | 2/2006 |
| EP | 0 272 282 A1 | 6/1988 |
| EP | 0 913 357 A1 | 5/1999 |
| EP | 0 977 293 A2 | 2/2000 |
| EP | 1 166 865 A2 | 1/2002 |
| WO | 80/01065 A1 | 5/1980 |

\* cited by examiner

METHOD AND DEVICE FOR PRODUCING SYNTHESIS GAS FROM GASEOUS HYDROCARBONS

CROSS-REFERENCE TO RELATED APPLICATIONS

This application is the United States national phase of International Application No. PCT/EP2009/063073 filed Oct. 8, 2009, and claims priority to German Patent Application No. 102008050817.9 filed Oct. 8, 2008, the disclosures of which are hereby incorporated in their entireties by reference.

BACKGROUND OF THE INVENTION

1. Field of the Invention

The invention concerns a method and a apparatus for the production of synthesis gas from gaseous hydrocarbons by means of allothermal steam reforming with catalysts.

2. Description of Related Art

As resources are becoming ever more limited and more costly and energy demand is rising worldwide, all processes in the field of energy conversion must be made more compact, efficient and decentral. This applies in particular to the generation of electricity and heat and for propulsion of vehicles. Thus for example by converting primary energy into hydrogen, and decentral energy conversion by means of a cogeneration of heat and power using fuel cells, a very high yield of useful energy can be achieved. Around half the useful energy is released in the form of electrical energy. This is far more than needed today. Power and heat in this system have almost equivalent value. Details are described in the book by Tetzlaff "Wasserstoff für elle" ["Hydrogen for all"] (ISBN 978-38370-6116-1).

Allothermal gasification methods generate a particularly high quality synthesis gas. As this is an endothermic reaction, the necessary thermal energy must be introduced by heat transfer into the reaction chamber. The necessary heat is generated by combustion of hydrocarbons with air or oxygen. A typical apparatus of this type consists of a box-like furnace which is fitted with a plurality of tubes filled with nickel-containing catalyst pellets. On the top of this furnace is a plurality of burner nozzles arranged between the tubes. To prevent local overheating, a large distance from the burner flame to the tubes must be maintained. Both flue gases and the hydrocarbons to be gasified in the tubes flow in a direct current from top to bottom.

The apparatuss of the prior art require a great deal of space and always generate an exhaust gas which must be cleared of air pollutants in a complex manner. Such systems can only be approved at great expense in densely populated modern states. As the reaction takes place at temperatures between 820° C. and 920° C., a large part of the energy introduced is lost through the exhaust gas.

SUMMARY OF THE INVENTION

The invention is therefore based on the object of designing and refining a method and an apparatus of the type cited initially such that the disadvantages outlined are avoided and synthesis gas can be produced efficiently without exhaust gas in a compact apparatus.

The object is achieved according to the invention with a method in which energy is at least partly supplied by electrical energy, in which the energy is supplied by electrically heated contact surfaces, and in which the energy is supplied by contact surfaces within a fixed bed of catalyst pellets and/or within a fluidised bed at least partly consisting of catalyst particles.

Furthermore the said object is achieved with an apparatus which means are provided to supply energy at least partly by electrical energy, that the means for supplying energy comprise electrically heated contact surfaces and that the contact surfaces are arranged within a fixed bed of catalyst pellets and/or within a fluidised bed at least partly consisting of small catalyst pellets.

If electrical energy is coupled into the process, this is transformed completely into synthesis gas. No energy is therefore lost. This also applies when part of the electrical energy is coupled into a pre-reformer if the perceptible heat of the synthesis gas is not sufficient to heat the input material flow and cover the energy requirements of the endothermic reaction. Pre-reformers are operated at 400° C. to 500° C. to break down higher hydrocarbons into small molecules so that no soot formation occurs in the main reformer. The main reformer is preferably operated between 820° C. and 920° C. To support the desired reaction, pre-reformers and main reformers are expediently operated with the aid of nickel-based catalysts. The flow direction of the gas to be reformed is irrelevant. Steam reformers of this type are normally operated at positive pressure in order to facilitate the subsequent process steps and the separation of the different gases.

The term 'gaseous hydrocarbons' also includes vaporisable hydrocarbons.

If the steam reformer is part of a hydrogen economy, the pressure is preferably at least so high that the hydrogen can be supplied in medium pressure lines at 16 to 25 bar without post-compression. Preferably therefore the operating pressure at the steam reforming is at least 16 bar, preferably between 16 and 30 bar, in particular between 16 and 25 bar.

If oxygen is available at low cost, for example as a waste product in the electrolysis of water by means of solar power, this can be used intermittently or proportionally for an autothermic operating mode. The direct introduction of oxygen is achieved at the cost of a higher $CO_2$ proportion in the synthesis gas, however.

Electrical energy can be coupled into the process in various ways, for example by microwaves, plasma converters and electrically heated contact surfaces. The simplest method is generation of hot contact surfaces by an electric resistance heater.

Energy is supplied to the allothermal steam reforming by electrically heated contact surfaces. The thermal energy is transmitted via the contact surfaces to the gas to be reformed and the catalyst. For this purpose a plurality of geometric arrangements of contact surfaces is possible.

In one embodiment of the invention, the electrically heated contact surfaces can be arranged in a fixed bed of catalyst pellets and transmit thermal energy to the catalyst pellets and the gas mixture still to be reformed to a varying extent.

In another embodiment of the invention the steam reformer can be operated as a fluidised bed reactor. For this the mixture of gas and steam is introduced from below into a fluidised bed which consists of particles with catalytically active material or of a mixture of catalytically active material and inert material such as sand. The particle size of the catalytically active particles, depending on density, can be between 0.1 mm and 2 cm. Large particles are, however, only suitable for a fluidised bed if they are used together with an inert fine-grain material and have around the same density. For sand the particle size is preferably between 0.15 mm and 0.8 mm. On exclusive use of catalytically active particles, the particle size lies within this range if a similar density is achieved as in quartz sand. Small particles are particularly advantageous because they allow good heat dissipation at the electrically heated contact surfaces.

To keep friction and abrasion within limits, the fluidised bed is formed as a stationary fluidised bed. Because of the extraordinarily high heat transmission between the fluidised bed and the embedded electrical heating, this arrangement is extremely compact. This arrangement is smaller by several orders of magnitude than the apparatuss according to the prior art. This would allow for high economy and efficiency even at higher power prices, in conjunction with the exhaust-free operation.

If necessary the contact surfaces themselves can be electrically heated by the application of an electrical voltage. The contact surfaces are then outer surfaces of an electrical resistor of the resistance heating. If necessary, however, electric heating in thermally conductive contact with the contact surfaces can be supplied to the contact surfaces. Depending on the design of the contact surfaces, one or other of these alternatives may be preferred.

One very effective and simple arrangement can be achieved by the immersion of plates, rods and/or tubes in a fixed bed of catalyst pellets, which form the contact surfaces for the energy or heat supply. The plates, rods and/or tubes can be heated by electric resistance heating. The plates, rods and/or tubes themselves can be formed as resistance heaters and if necessary form an electrical resistor of an electric resistance heating. The plates, rods and/or tubes can, however, also enclose an electric resistance heater.

With electric heating, it is easily possible to adapt the power to the actual needs of the reaction progress. This can be achieved either by prior calculation or by dynamic changes in operation. Thus the energy supply at the start of the reaction zone can be designed greater than in the further course of the reaction zone. It may also be advantageous to switch additional heat registers on and off. If necessary the energy supply can be adapted to actual needs via the height or length of the fixed bed of catalyst particles or the fluidised bed. This can be achieved very simply in that the resistance of the resistance heating can be changed over the height or length of the fixed bed of the catalyst pellets or the fluidised bed.

Alternatively or additionally this specific contact surface can be formed varying in relation to the height or length of catalyst fixed bed along the height or length of the fixed bed of catalyst pellets or the fluidised bed. In other words, in regions of the fixed bed of catalyst pellets or the fluidised bed with a greater heat requirement, a greater specific contact surface can be provided than in regions with a lower heat requirement. Alternatively or additionally the specific contact surface can also be increased in regions of the fixed bed of catalyst pellets or fluidised bed in which the temperature gradient between the contact surfaces and the catalyst pellets or catalyst particles is smaller.

Preferably, the synthesis gas can be obtained from a methane-containing gas. The production of synthesis gas from methane-containing gases finally constitutes an efficient alternative to motorised combustion of methane-containing gases, for example in so-called combined heat and power stations (cogeneration unit). A particularly high overall efficiency can be achieved on the use of biomass if the methane-containing gas is a biogas, a landfill gas and/or a sewage gas.

The term biogas in this context means a gas which is produced by decomposition of biomass in biogas plants and comprises, as well as water vapour, methane and carbon dioxide ($CO_2$) as main components. Landfill gas and sewage gas are, like biogas, obtained from the anaerobic decomposition of biomass known as digestion or fermentation. The biomass is either into introduced a landfill or occurs in waste water treatment.

With corresponding raw material prices, alternatively or additionally it can be particularly economic if the synthesis gas is made from natural gas and/or naphtha.

For endothermic conversion of hydrocarbons to synthesis gas, preferably nickel-containing catalyst pellets are used. Due to the high activity of these catalyst pellets, only low reactor volumes are required for synthesis gas production. In principle, however, all compounds known from the prior art which are catalytically active in steam reforming are conceivable.

For example from the aspect of improved process control it may be expedient to carry out the reforming partly in a pre-reformer and partly in a main reformer. The pre-reformer and/or the main reformer can comprise a fixed bed of catalyst pellets. Alternatively or additionally the pre-reformer and/or the main reformer can have a fluidised bed of catalyst particles. In this way the method and the apparatus for the production of synthesis gas can be adapted well to the respective crude gases used. It is constructionally simple if the pre-reformer and the main reformer use the same fixed beds of catalyst pellets or fluidised beds from the same catalyst particles.

In addition the contact surfaces for direct or indirect supply of electrical energy can be provided in the pre-reformer and/or in the main reformer. If the contact surfaces are provided in both the pre-reformer and in the main reformer, the processes taking place there can be controlled very well. Also the total process can be structured very efficiently.

The contact surfaces for the supply of energy for allothermal steam reforming can be arranged in the pre-reformer and/or in the main reformer in a fixed bed of catalyst pellets. Alternatively or additionally the contact surfaces can also be arranged in the pre-reformer and/or in the main reformer in a fluidised bed comprising catalyst particles. It must be taken into account that a fixed bed of catalyst pellets can be operated on a regular basis more simply with respect to the technical method and the apparatus. However, a fluidised bed regularly allows a better exchange of heat and substance.

The hydrogen produced from synthesis gas from biomethane (biogas) can be part of a heat-controlled solar hydrogen economic, Methane (biogas) from the fermentation process is considered as a future resource.

BRIEF DESCRIPTION OF THE DRAWINGS

The invention is now described in more detail with reference to the drawing showing merely exemplary embodiments. The drawings show.

DETAILED DESCRIPTION OF THE INVENTION

Figure 1:
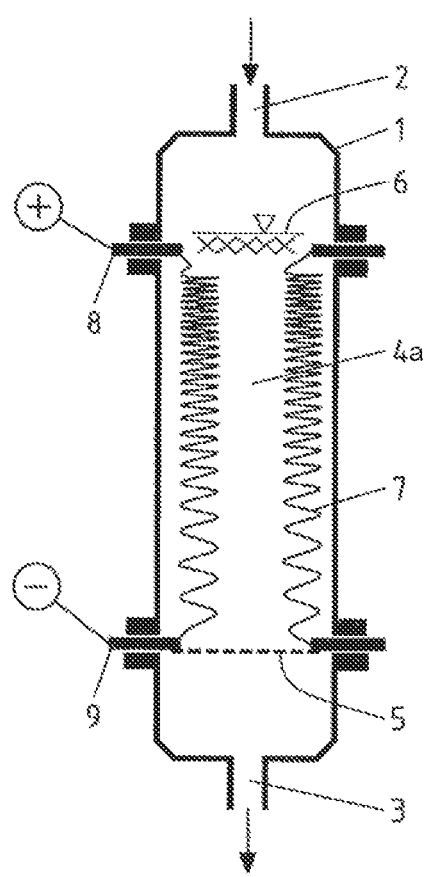
FIG. 1 a first exemplary embodiment of the apparatus according to the invention for the production of synthesis gas, and FIG. 2 a second exemplary embodiment of the apparatus according to the invention for the production of synthesis gas.

FIG. 1 shows a reactor 1 for the performance of an endothermic conversion of the gas to be reformed. The gas to be reformed passes through the opening 2 into a fixed bed 4a of catalyst pellets. This fixed bed 4a is supported at the bottom by a screen 5. In practice, such screens are attached to perforated floors which carry the load. So a perforated floor can equate to the minus pole 9 (earth) of the electric heating 7. The upper border 6 of the fixed bed 4a in the exemplary embodiment shown is arranged above the electric heating 7. Often the top layer of the fixed bed 4a is formed as an inert dust-catching layer. The heating 7 of the reactor 1 consists of a plurality of rods or tubes, here designed as coils. These coils have fewer windings in the upper region than at the bottom. In this way the necessary energy supply can be adapted to the pre-calculated need. The power supply 8 can be formed in the centre as a perforated plate or grille. The power supply 8 must be isolated from the apparatus flanges. The synthesis gas leaves the reactor 1 through the opening 3.

Figure 2:
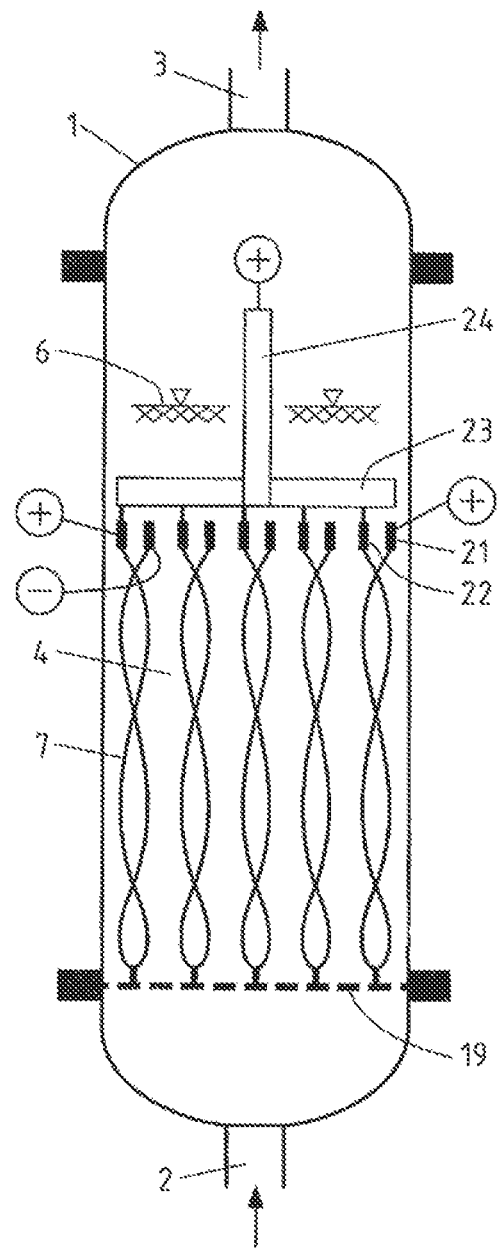

FIG. 2 shows a reactor 1 which is formed as a stationary fluidised bed reactor. Within the fluidised bed 4, which extends from the nozzle base 19 to an upper border 6, an electric resistance heater 7 is arranged. The electric resistance heater 7 consists of a plurality of rods or tubes which are in contact with the bus bars 21 and 22 and are also held there mechanically. The rods or tubes are formed as loops which are twisted. This twist ensures the destruction of large bubbles in the fluidised bed and improves cross-mixing and heat transfer to the contact surfaces. To ensure the mechanical stability, these rods or tubes can be attached to the nozzle base 19. The fixing must be isolated if the rods or tubes form the resistance heating 7 themselves. The power supply can, for example, take place via concentrically arranged tubes 24 which must be isolated from each other. These tubes 24 also form the mechanical support in the upper area. From the concentric tubes 24 the power is then distributed to the bus bars 23 which in turn are in contact with the lower bus bars 21 or 22. To ensure that no overheating occurs, in the reactor shown the entire heating system is located within the fluidised bed.

If the twisted loops formed as a resistance heater 7 are produced in the lower region from materials with high electrical resistance and in the upper region from materials with low resistance, the fluidised bed need only cover the region of the loops, which because of their high resistance emit a high thermal power. In this case the bus bars 21, 22, 23 should also be made of a material with low resistance. Bus bars outside the fluidised bed have less wear. Naturally the heating can also be designed conventionally with internally heated tubes. However, this requires a complex construction and constant flushing of the tubes so that the heating coils do not become fragile due to the diffused hydrogen. The gas-steam mixture to be reformed which flows into the opening 2 forms the fluidising gas for the fluidised bed 4. The synthesis gas leaves the reactor 1 through the opening 3.

The invention allows a substantial reduction in investment costs and increased efficiency. In view of the constant rise in overall efficiency in the generation of electricity and heat, the use of electrical energy for steam reforming is not a waste of energy but a contribution to the economic use of energy.

The invention claimed is:

1. A method for the production of synthesis gas from gaseous hydrocarbons having a means of allothermal steam reforming with catalysts, the method comprising:
   supplying energy at least partly supplied by electrical energy, wherein
   the energy is supplied by electrically heated contact surfaces,
   the contact surfaces are within a fluidised bed, wherein the fluidized bed at least partly consists of catalyst particles,
   wherein the contact surfaces are formed by an electric resistance heater that forms a heating device that produces heat independent of the catalyst particles and fluidised bed.

2. The method according to claim 1, wherein the contact surfaces are directly heated by application of an electrical voltage.

3. The method according to claim 1, wherein the synthesis gas is produced from a methane-containing gas, preferably from a biogas, landfill gas and/or sewage gas.

4. The method according to claim 1, wherein the synthesis gas is produced from natural gas and/or naphtha.

5. The method according to claim 1, wherein the contact surfaces are the outer surfaces of an electrical resistor of the electric resistance heater.

6. The method according to claim 1, wherein the contact surfaces are outer surfaces of plates, rods, and/or tubes that are connected to a power source and arranged in the fluidised bed to form the electric resistance heater that produces the heat independent of the catalyst particles and fluidised bed.

7. An apparatus for the production of synthesis gas from gaseous hydrocarbons having a means of allothermal steam reforming, the apparatus comprising:
   with catalysts,
   a means for supplying energy at least partly by electrical energy, wherein
   the means for supplying energy comprise electrically heated contact surfaces, and
   the contact surfaces are arranged in a fluidised bed, wherein the fluidized bed at least partly consists of catalyst particles,
   wherein the contact surfaces are formed by an electric resistance heater that forms a heating device that produces heat independent of the catalyst particles and fluidised bed.

8. The apparatus according to claim 7, wherein the contact surfaces are the outer surfaces of an electrical resistor of the electric resistance heater.

9. The apparatus according to claim 7, wherein the contact surfaces are formed by plates, rods and/or tubes introduced into a fixed bed of catalyst pellets and/or into the fluidised bed.

10. The apparatus according to claim 9, wherein the plates, rods and/or tubes form an electrical resistor of an electric resistance heater.

11. The apparatus according to claim 7, wherein catalyst pellets and/or the catalyst particles contain nickel.

12. The apparatus according to claim 7, further comprising a pre-reformer and a main reformer connected after the pre-reformer.

13. The apparatus according to claim 12, wherein the means to supply energy further comprising contact surfaces which are arranged in the pre-reformer and/or in the main reformer.

14. The apparatus according to claim 13, wherein the contact surfaces in the pre-reformer and/or in the main reformer are arranged in a fixed bed of catalyst pellets.

15. The apparatus according to claim 13, wherein the contact surfaces in the pre-reformer and/or in the main reformer are arranged in a fluidised bed at least partly consisting of small catalyst particles.

16. The apparatus according to claim 7, wherein the contact surfaces are outer surfaces of plates, rods, and/or tubes that are connected to a power source and arranged in the fluidised bed to form the electric resistance heater that produces the heat independent of the catalyst particles and fluidised bed.

* * * * *